United States Patent [19]

Barth et al.

[11] 4,223,585
[45] Sep. 23, 1980

[54] DOUBLE-ENDED STUD WITH COMBINED DRIVING AND LOCKING MEANS

[75] Inventors: Gerald D. Barth; Walter T. Durham, both of Elgin, Ill.

[73] Assignee: Illinois Tool Works Inc., Chicago, Ill.

[21] Appl. No.: 921,662

[22] Filed: Jul. 3, 1978

Related U.S. Application Data

[63] Continuation-in-part of Ser. No. 805,056, Jun. 9, 1977, abandoned.

[51] Int. Cl.$^2$ .................. F16B 23/00; F16B 35/04
[52] U.S. Cl. ........................................ 85/42; 85/45; 85/47; 151/37
[58] Field of Search ............... 85/45, 42, 14, 47, 9 R; 151/37, 41.73, 41.5, 34; 145/50 A, 50 R; 81/119, 121 R

[56] References Cited

U.S. PATENT DOCUMENTS

| | | | |
|---|---|---|---|
| 1,458,956 | 6/1923 | Sayer | 81/121 R X |
| 1,896,388 | 2/1933 | Zeidler | 85/42 X |
| 3,241,589 | 3/1966 | Enders | 151/34 |
| 3,897,713 | 8/1975 | Gugle | 85/42 |
| 4,125,051 | 11/1978 | Herkes et al. | 85/45 |

FOREIGN PATENT DOCUMENTS

| | | | |
|---|---|---|---|
| 609809 | 12/1960 | Canada | 85/47 |
| 466526 | 5/1914 | France | 85/45 |
| 1232468 | 4/1960 | France | 85/45 |
| 13555 | of 1913 | United Kingdom | 85/45 |
| 466039 | 5/1937 | United Kingdom | 85/47 |

*Primary Examiner*—Ramon S. Britts
*Attorney, Agent, or Firm*—Thomas W. Buckman; Richard K. Thomason; Robert W. Beart

[57] ABSTRACT

An integral stud member having shank portions extending from either side of a radially extending flange. A first shank portion including thread convolutions with means to form mating internal threads in an associated workpiece. The surface of the flange opposing the first shank including generally radially extending rib-like surfaces which serve as the means to drive the fastener in place. The rib structures are configured to permit a driver to softly engage the flange and to lock the fastener from backing out of the workpiece after a secondary work surface has been clamped over the flange.

7 Claims, 12 Drawing Figures

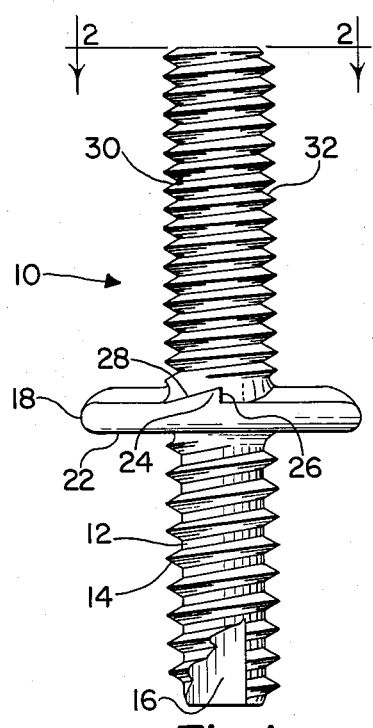
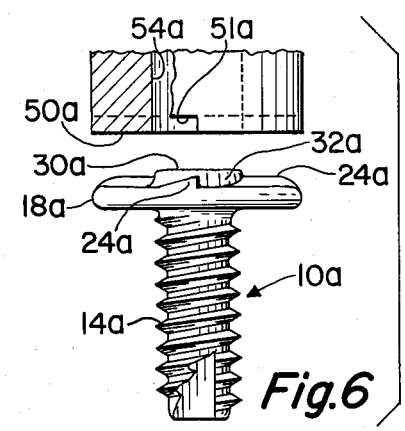
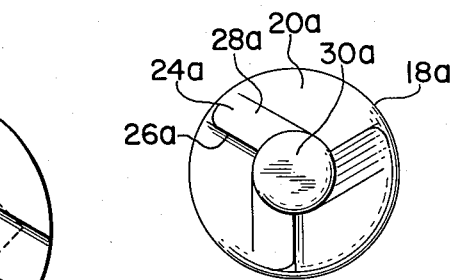
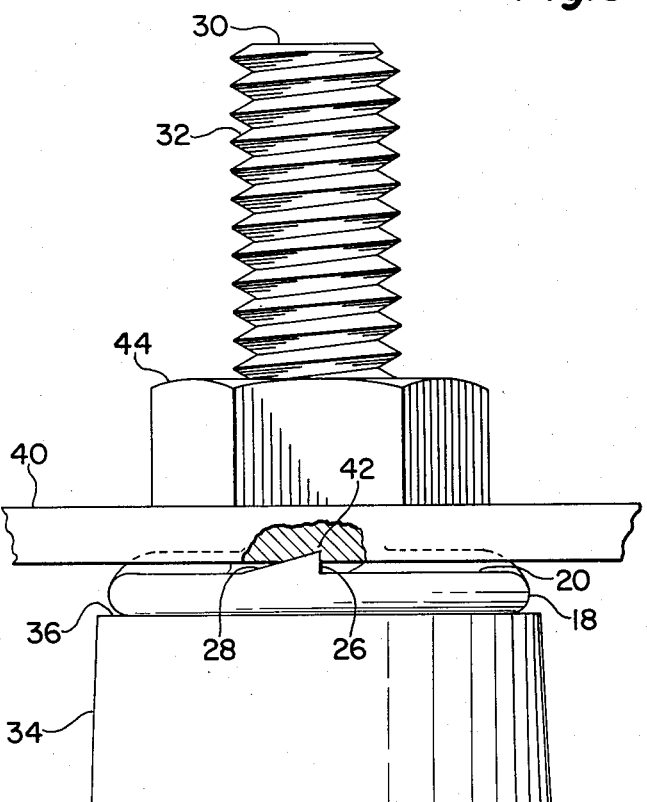
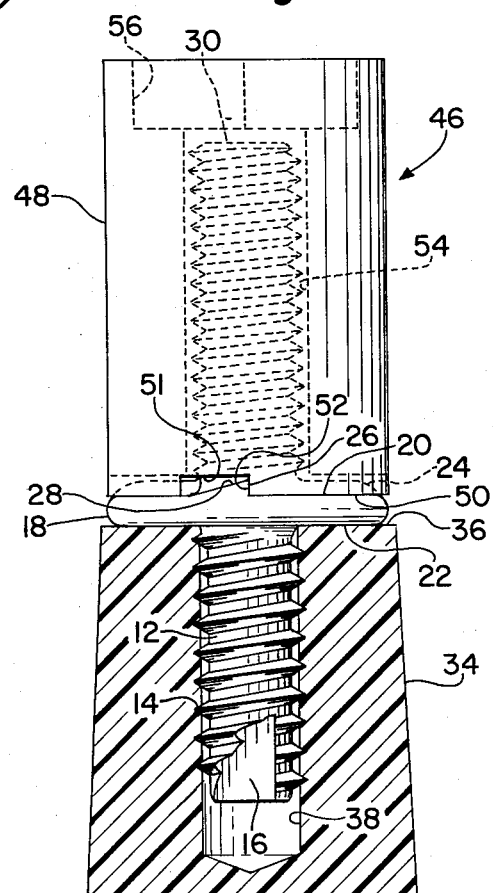
Fig.1  Fig.2  Fig.6  Fig.5  Fig.7  Fig.4  Fig.3

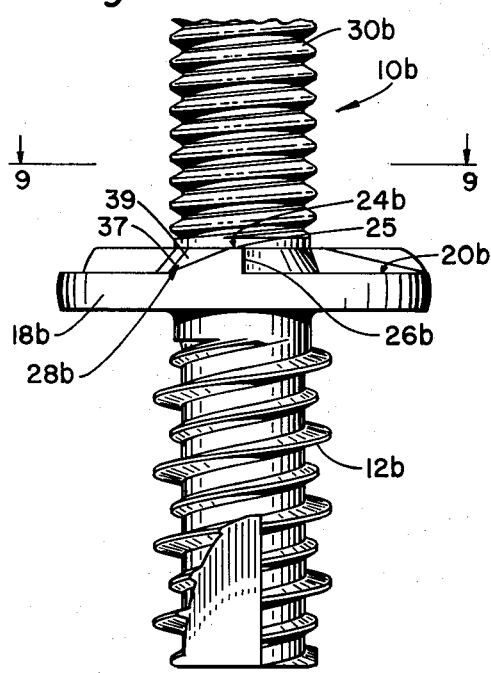
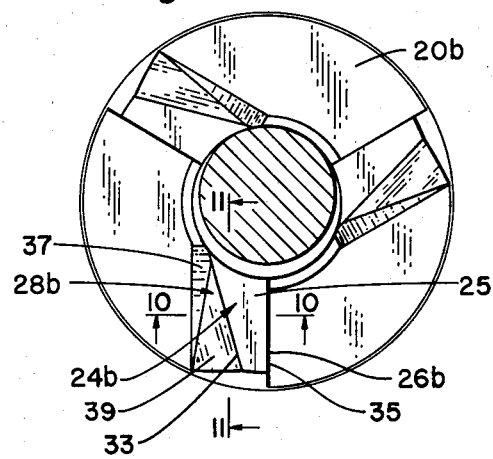
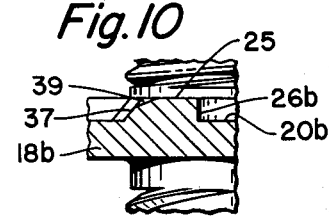
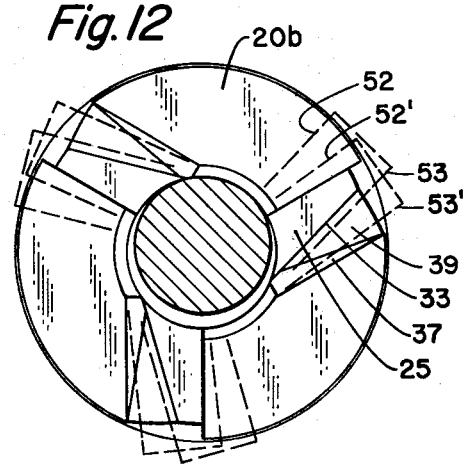
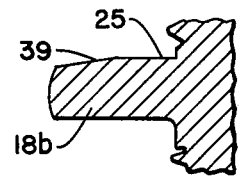

DOUBLE-ENDED STUD WITH COMBINED DRIVING AND LOCKING MEANS

This application is a continuation-in-part of Ser. No. 805,056 filed June 9, 1977, now abandoned.

BACKGROUND OF THE INVENTION

Double-ended stud-like fasteners consisting of a machine screw thread on one end, a pancake-type flange or head in the middle and a special thread tapping screw at the other end are commonly used in environments where the primary supporting surface is of a plastic-type material with securement therein being a blind application.

Typical applications of this type are those of automotive where plastic components are provided with boss-like protuberances having preformed bores in order to accept the tapping thread end of the stud. The studs are usually first driven into the plastic bosses with a stud driver leaving the machine screw end to be inserted later through clearance holes in sheet metal workpieces. Nuts are then used to clamp the sheet metal against the pancake head of the double-ended stud which puts all the load on the machine screw end of the stud and eliminates any added stress to the plastic during installation.

A typical manner of driving such double-ended studs has been to utilize the upwardly extending threaded shank and transmit torque to the fasteners by means of a chuck grasping the threaded section. Another method utilizes the outer periphery of the flange to drive the fastener. Such applications and tools tend to be significantly greater in diameter than the diameter of the flange and/or the boss which the stud is to be associated with. In many such applications, the bosses are in confined areas and size of the tool is a definite factor in efficiently driving such fasteners.

In addition to the application or driving problems associated with prior art systems, a substantial problem exists in securing the fastener from backing out or rotation tending to remove after the fastener has been installed. For a variety of reasons, the clamping nuts may have to be removed and/or the sheet metal removed from the installation. When torque is applied to the system to remove the nut, it is also applied to the stud tending to loosen or remove the stud itself from the plastic. A number of techniques have been suggested to eliminate this tendency to remove the stud when the nut is removed. Adhesives, special thread forms, locking means beneath the pancake head or a combination of special configurations of boss and pancake head have been suggested. However, the prior art suggestions are either costly, cumbersome or contributory to further deterioration and stressing of the plastic during installation.

SUMMARY OF THE INVENTION

The present invention is concerned with a double-ended stud having dual purpose ribs formed on the upper surface of a pancake-type flange and a tool for inserting such a stud in an associated work surface. Radially extending, sharp edged, ribs on the upper surface of the flange function to drive the fastener and to embed in the undersurface of a secondary work plate clamped over the stud/boss combination securing the fastener against retrograde movement of the stud.

A tool particularly designed to insert such a double-ended fastener in a workpiece includes an end surface with a plurality of radially extending abutment surfaces formed therein adapted to engage the ribs on the flange. An axial bore in the tool receives the upwardly extending stud shank during the driving so that the end surface of the tool may freely contact the flange.

In contrast with prior art methods of applying double-ended studs, the stud and tool described herein permit the axial driving pressure to be carefully controlled and confined while the fastener is stabilized or centered in a properly fixtured driving tool. The axial driving pressure is thus controlled and concentrated to maximize the efficient application of the torque transmitting pressures which are distributed over the surface of the flange rather than applied to the smaller diameter of the upwardly extending shank.

The tool is designed so that its mating end surface is substantially equal to the flange diameter of the stud. This allows the tool to be used in confined areas and eliminates any contact of the tool with the plastic itself.

The ribs formed on the upper surface of the flange should include at least a primary abutment surface extending perpendicular to the flange surface and a secondary camming surface extending toward the primary surface at an acute angle to the upper surface of the flange. The ribs are preferably configured to permit a rotating, mating driving tool to softly engage the primary abutment surface and the flange to insure adequate tool life.

It is, therefore, an object of the present invention to provide an improved double-ended stud with means to prevent removal of the stud upon removal of a clamping nut associated thereon.

A further object of the invention is to provide a double-ended stud with an improved means for driving into a workpiece.

Yet another object of the invention is to provide a double-ended stud with a single structural improvement that serves to both improve the driving and locking characteristics of the stud.

Yet another object of the invention is to provide a driving tool for association with the stud of the present invention and with fasteners having tamperproof features.

Another object of the invention is to provide a low profile flange surface that provides reliable driving surfaces and minimizes driving tool wear.

Other objects and advantages of the present invention will become apparent from the following description and the accompanying drawings.

BRIEF DESCRIPTION OF THE DRAWING

FIG. 1 is a side elevational view of the double-ended stud embodying the features of the invention.

FIG. 2 is a top plan view of the stud as taken along lines 2—2 of FIG. 1.

FIG. 3 is a side view, in partial section, of the stud member inserted in a boss surface through the use of a particularly designed tool.

FIG. 4 is an enlarged side view, in partial section, of an assembly using the double-ended stud inserted in the workpiece and showing a nut member clamping a secondary work plate over the flange.

FIG. 5 is an end view of the tool taken from its work contacting surface end.

FIG. 6 is an elevational view, in partial section, of the tool of the invention in association with a fastener of modified design.

FIG. 7 is a top plan view of the fastener of modified design shown in FIG. 6.

FIG. 8 is a partial side elevational view of an alternate embodiment of a double-ended stud embodying the features of the invention.

FIG. 9 is a top plan view of the stud of FIG. 8 as taken in the direction of lines 9—9 of FIG. 8.

FIG. 10 is a cross-sectional view taken along lines 10—10 of FIG. 9 showing the rib configuration.

FIG. 11 is a cross-sectional view taken along lines 11—11 of FIG. 9 showing the rib configuration.

FIG. 12 is a top plan view, similar to that of FIG. 9, showing in dotted lines various locations of recesses on a driving tool relative to the rib surfaces.

DESCRIPTION OF THE PREFERRED EMBODIMENTS

Turning first to FIGS. 1 and 2, the double-ended stub 10 of the present invention will include a first, lower stud shank 12 coaxially arranged with a second, upper stud shank 30 with an integral, pancake-type flange 18 positioned intermediate the shanks. The first stud section 12 is designed to be associated with a blind bore in a workpiece structure, such as a plastic boss. With this in mind, it is preferably provided with a thread convolution 14 of rather sharp crested, spaced threads. A thread cutting slot 16 is formed in the extremity of the screw to facilitate the anchoring embedment of this first shank within the bore of the primary work structure. It should be noted, however, that even though a thread cutting slot is shown in the preferred embodiment, a number of alternate configurations can be used to properly form or generate an internal thread in the primary work structure.

A radially extending flange 18 is configured to provide a generally flat undersurface 22, adjacent the first stud section 12, and an upper surface 20 adjacent the second stud section 30. The upper surface 20 includes a plurality of generally radially extending protuberances formed on an otherwise flat upper surface. These protuberances form an important aspect of the invention and their dual purpose will be described in detail further herein.

The preferred embodiment of the invention shows three rib-like members extending generally radially of the axis of the fastener. The rib member 24 will comprise a primary, torque accepting surface 26, extending substantially perpendicular to the remaining surface regions of the upper flange surface 20. The surfaces 26 will also extend radially of the axis of the fastener to achieve maximum efficiency of the rotary force applied to the fastener. A secondary surface 28, in the form of a ramp, extends upwardly at an acute angle to the upper flange surface and toward the plane of the primary drive surface 26. The camming surface 28 permits an associated driver, such as 46, to be placed in operative position with a gradual and "soft" engagement onto the flange surface 20. The preferred embodiment discloses the camming surface as directly intersecting the abutment surface 26, however it should be understood that intermediate surfaces could be provided of any variety of configurations, such as the embodiment of FIGS. 8-12, and still come within the broad scope of this invention.

While the invention incorporates driving means on the upper surface of the flange, it should be understood that the total height of the flange and protuberances should be minimized to minimize the space between the secondary work plate being secured and the primary work structure. Such a low profile, efficient driving means is in part obtained by a relatively large surface area of the upper flange which cooperates with the end surface of a mating tool to align and stabilize the tool on the fastener.

A reference to FIGS. 3 and 5 will show a tool for driving the above-described fastener and the typical application for such a fastener. A typical use for double-ended fasteners of the type described is to achieve a means to clamp a secondary work structure or plate-like device to a molded plastic structure. Common applications for double-ended studs include fastener receiving bosses, such as 34, formed in an otherwise thin plastic structure. The bosses include a bore 38, of a predetermined diameter. In use, the stud member 10 is associated with a driving tool 46 with the second stud section 30 received in a bore 54 in the body 48 of the tool. The fastener member 10 may be retained in the tool prior to driving, through the use of magnets or the like (not shown). Torque transmitting surfaces, such as a socket 56, may be formed in the extremity of the tool opposite the work engaging extremity to transmit torque from a power tool to the stud driving attachment 46. It should be noted that the diameter of the body 48 is substantially that of the flange 18 and upper surface 36 of the boss. This dimensional relationship is permitted by the novel configuration of the tool herein described and becomes important in securing fasteners in confined regions or in an area where the center line to center line distance between adjacent like fasteners is small.

As best shown in FIG. 5, work engaging end surface 50 of the tool 46 is provided with a plurality of grooves 51 equal in number to the number of ribs 24 on the fastener. These grooves will easily nest with the associated ribs due in part to the cooperation of the camming ramp surface 28 of each rib with the grooves.

While the configuration of the grooves 51 may take several forms, all of them preferably will include a generally perpendicularly arranged primary abutment surface 52 adapted for operative association with the perpendicularly arranged primary driving surface 26 on the fastener. The height of the primary abutment surface 52 should preferably be at least as much as the height of mating surface 26 so that the end surface 50 engages top surface 20 of the flange. The engagement of the remainder of the surface 50 with the top flange surface 20 provides an alignment and stabilization to the fastener as it is being driven. Further attention is directed to the alignment and stabilization provided by the telescopic association of the upper stud shank 30 with the bore 54, which is dimensioned so that both the length of the stud and the diameter are received therein without abutment.

A reference to FIG. 4 will show a second important function of the ribs 24 on the fastener. Once the stud 10 is properly seated on the upper surface 36 of the boss 34, the secondary plate 40 is positioned, preferably through the use of a clearance hole, over the stud section 30. The plate 40 is then clamped against the upper surface 20 of the flange in a manner shown in FIG. 4. This clamping is achieved through the use of a nut member 44. The nut member 44 will typically have the same hand of rotation for its internal threads as that of the thread configuration 14 on the first stud shank which is driven into the boss 34. It should be noted that while the preferred embodiment shows a machine thread 32 on the second stud section 30, that it is conceivable that the stud section 30 may be void of threads and that the nut member 44 may be of a thread forming type. In any event, the problems solved by the invention are the same, that being the securement of the stud 10 from retrograde movement as the nut 44 is subjected to a torque to break the clamping engagement between the nut and member 40. It should be noted that upon tight clamping of the nut 44 against the plate 40, the sharp apex of the rib 24 embeds in the undersurface of the plate in regions 42. Due to the perpendicular arrangement of the surface 26, torque forces applied to the stud during efforts to remove the nut, are resisted due to the locking embedment of the ribs 24 with the plate 40.

While the tool of the invention has been described in connection with a double-ended stud, reference to FIGS. 6 and 7 will point out the advantages of such a tool with a fastener of modified design. Several important features of the double-ended stud could be incorporated in a fastener having a non-removable tamperproof head. For example, fastener 10a is configured to have a low profile head including a pancake-type flat flange 18a and an axially extending threaded shank 14a. The upper surface of the flange will be configured with radially extending ribs 24a comprising a perpendicular driving surface 26a and ramp surface 28a permitting driving in only one direction. A cylindrical stub shank 30a is axially disposed on the flange with side walls 32a extending a height not substantially exceeding the height of driving surface 26a.

The driving tool 46a can be associated with the tamperproof fastener 10a in a manner identical to that described above relative to double-ended fastener 10. The tool 46a is described with like reference numerals identifying like elements to 46 with the addition of a suffix "a". It should be particularly noted that bore 54a is of such a diameter as to receive stub shank 30a and support the side walls 32a therein to center and stabilize the fastener 10a during driving. The stub shank 30a will be a height great enough to accomplish this cooperation with the tool 46a but not so great as to permit the fastener to be removed through the grasping of the shank with a tool.

A further embodiment of the invention, shown in FIGS. 8–12, is configured to minimize wear of a mating driving tool. Fastener 10b incorporates an upper shank 30b, a lower shank 12b, and an intermediate flange 18b. Protuberances 24b include a primary torque accepting surface 26b and secondary camming surface 28b. A planar surface 25 intersects primary surface 26b on a radial line 35 and the upper region 39 of secondary surface 28b along a line 33 extending generally tangentially from the shank 30b. The juncture of secondary surface 28b and planar surface 25 thus extends at an acute angle to the line of intersection between surface 25 and surface 26b.

The combination of the flat surface 25 and secondary surface 28b intersecting surface 25a in a manner shown contributes greatly to decreasing wear on a tool such as 46. As shown in FIG. 12, the leading edge 53 of recess 51 in a tool, such as shown in FIG. 5, is generally aligned with juncture line 33 thus creating a gradual controlled descent of end surface 50 onto flange upper surface 20b. The position of leading edge 53' in FIG. 12 indicates that continued clockwise rotation of tool 50 still permits edge 53' to be in line contact with camming surface 39. This soft engagement provided by the controlled drop over the surface extent created by the small acute angle formed between surface 39 and the plane of upper surface 20b and flat surface 25 diminishes wear on all contacting edges of the tool. As noted in FIG. 11, surface 39 is sloped downwardly and outwardly toward the periphery of the flange. Such a structure enhances the soft controlled descent of the tool. Wear on tools, such as rounding of edges, etc., becomes critical to proper functioning of this invention because of the desire to obtain a low profile flange. Reliable positive abutting contact between surface 26b and torque imparting surface 52 on a tool is necessary to effect proper alignment of the tool with respect to the fastener. Undue wear would deleteriously affect such alignment.

The flat surface will eliminate the very sharp edge contact on the undersurface of a very thin workpanel 40 which could totally penetrate such a workpanel. However, the right angle edge 35 and limited surface areas of the surface 25 adjacent the outer periphery of the flange 18b will still permit the partial embedment and locking feature shown generally in FIG. 4.

Secondary surface 28b may be comprised of a pair of intersecting camming surfaces extending at different acute angles from the upper surface 20b. A camming surface 37 may be formed to intersect surface 39 with surface 39 intersecting the flat surface 25 along line 33 and lower surface 37 intersecting the flange upper surface 20b. Surface 37 will be at a greater acute angle to surface 20b than surface 39 permitting the tool to gradually descend downwardly. Surface 37 contributes to strength of the protuberance and efficient manufacture thereof.

Thus there is shown and described a double-ended stud which includes novel driving surfaces which also function as a means to lock the fastener from removal as the nut member is loosened therefrom. In addition, a particularly designed tool is shown for accomplishing the driving of a fastener into a work surface.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and broad scope of the invention.

We claim:

1. A fastener member including a first stud shank with a flange extending radially therefrom, said first stud shank including a helical thread formed thereon, said helical thread incorporating means to form a mating internal thread in a preformed bore in an associated work surface, the flange defining a lower surface adjacent said first stud and an upper surface opposite to said lower surface, upstanding protuberance means formed on said upper surface of the flange, said protuberance means including generally radially extending ribs each having a primary rotary driving surface extending upwardly perpendicularly from the upper surface of the flange, an upper surface on said protuberance formed as a first planar surface intersecting the primary rotary driving surface and extending generally perpendicular thereto, a secondary surface defined by a second planar surface which extends upwardly at an acute angle from the plane of the flange, the line of intersection between said first and second planar surfaces lying in a plane which extends generally tangentially from said first stud shank toward the primary driving surface, said line of intersection thus being disposed at an acute angle to the line of intersection between the first planar surface and the primary driving surface, said protuberance means being adapted for one-way engagement by a mating tool to rotate the fastener member about its axis into the bore in the associated workpiece.

2. The fastener member of claim 1 wherein the edge formed by the line of intersection between the primary surface and the first planar surface is adapted to lockingly embed in the undersurface of a secondary workpiece clamped over the upper surface of the flange.

3. The fastener member of claim 1 including a second stud shank extending from the upper side of the flange, said second stud shank including a helical thread formed thereon of the same hand as the thread formed on the first stud shank.

4. The fastener member of claim 3, in combination with a threaded nut member associated with the second stud shank and adapted for use with a secondary workpiece above said flange, the thread configuration of the nut member being of the same hand as the thread on the first stud shank, wherein the protuberance means is embedded in the undersurface of said secondary workpiece and resists rotation of the fastener member about its axis when torque is applied to the nut member in the direction of removal.

5. The fastener member of claim 3, wherein the first stud shank includes spaced threads with sharp crests and a thread cutting slot formed therein, the second stud shank including a machine screw thread configuration of the same hand as the spaced threads of said first shank.

6. The fastener member of claim 3, wherein the primary rotary driving surface extends radially from the axis of the stud shanks.

7. The fastener member of claim 3, wherein the protuberance means further includes a third planar surface, said first planar surface intersecting the second stud shank, said third planar surface intersecting said second planar surface along a juncture line extending from the region of intersection between said first planar surface and said second stud shank to a point adjacent the outer perimeter of the flange, the second flat surface extending at a lesser acute angle to the plane of the upper surface of the flange than said third planar surface.

* * * * *